L. A. KALLSTROM.
ATTACHMENT FOR COOKING VESSELS.
APPLICATION FILED MAR. 16, 1911.
999,567.
Patented Aug. 1, 1911.
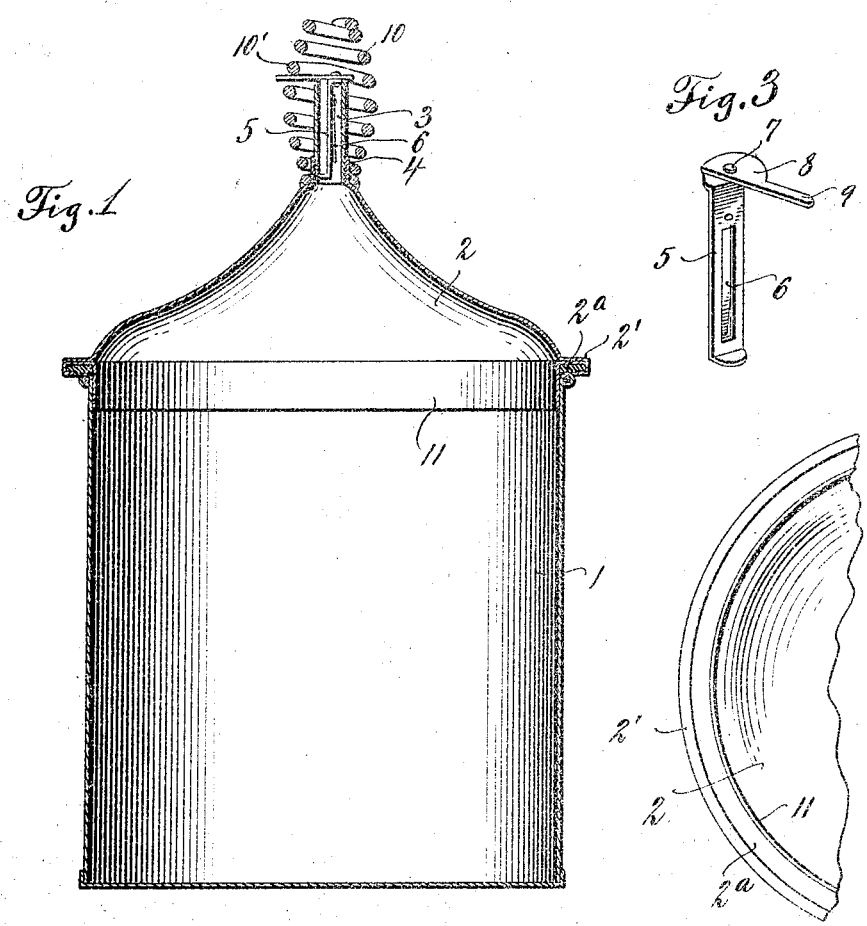
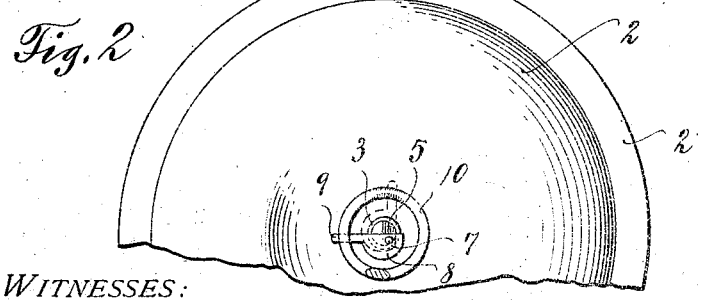
WITNESSES:
E. Larson
M. Steadman
INVENTOR
L. A. Kallstrom
BY Beelart Robb
Robb
Attorneys

UNITED STATES PATENT OFFICE.

LARS A. KALLSTROM, OF ASTORIA, OREGON.

ATTACHMENT FOR COOKING VESSELS.

999,567. Specification of Letters Patent. Patented Aug. 1, 1911.

Application filed March 16, 1911. Serial No. 614,814.

*To all whom it may concern:*

Be it known that I, LARS A. KALLSTROM, a subject of the Czar of Russia, residing at Astoria, in the county of Clatsop and State of Oregon, have invented certain new and useful Improvements in Attachments for Cooking Vessels, of which the following is a specification.

The purpose of this invention is to provide a simple attachment for domestic vessels in the form of an audible alarm or signal to indicate when the contents of the receptacle have been heated to a boiling point. The attachment comprises a whistle mounted peculiarly in reference to a handle member applied to the cover of the receptacle.

With the above and other objects in view, this invention consists in the construction, combination, and arrangement of parts all as hereinafter more fully described, claimed and illustrated in the accompanying drawings wherein—

Figure 1 is a vertical sectional view of a domestic vessel showing the invention applied thereto; Fig. 2 is a fragmentary top plan view of the vessel, the portion of the handle above the whistle member being broken away to show the latter more clearly; Fig. 3 is a perspective view of the reed supporting plate and the closure which coöperate with the whistle 2; Fig. 4 is a fragmentary bottom plan view of the cover of the receptacle, the gasket removed.

Throughout the following detail description and on the several figures of the drawings, similar parts are referred to by like reference characters.

Describing the present invention specifically, in the drawings 1 denotes a receptacle of any conventional type in which water or food products may be boiled in cooking operations. A cover 2 is provided for the receptacle 1, and the signal comprising the essential feature of this invention is preferably located at the upper tapered extremity of said cover. The signal referred to comprises a whistle consisting of a tube 3 which fits in and is slipped or inserted into the hollow boss 4 at the upper end of the cover 2. In the tube 3 is a plate 5 soldered or otherwise fastened to the tube and carrying a reed 6. It will be evident that, when the contents of the receptacle 1 are raised to a boiling temperature, the passage of the steam from the receptacle through the tube 3 will open the reed 6, the parts just described constituting a whistle or audible signal. At the upper end of the tube 3 and secured by a pivotal connection 7 to a lateral extension of the plate 5, is arranged a closure 8 having a handle 9. The closure 8 is adapted to be turned by the handle 9 so as to completely close the upper end of the tube 3, thus preventing escape of steam particularly during the initial heating of the contents of the vessel. When the contents of the receptacle 1 are heated sufficiently to allow steam to be generated, the operator will move the closure 8 so as to open the upper end of the tube. Under certain conditions, as well known in cooking operations, the attendant is not always able to remain near the place where the cooking is carried on and hence, the attachment above described is advantageous because it is only necessary to open the tube 3 by operation of the closure 8, and as soon as the contents of the receptacle 1 are brought to the boiling point, the whistle 3 will sound its signal and continue to do so until the closure 8 is turned sufficiently to prevent operation of said whistle.

Adjacent to the whistle tube 3 and surrounding the same is provided a handle 10 made of coiled wire. Said handle not only performs the function of a guard for the whistle attachment to prevent burning of the hand of the operator, but one of the coils 10' of the handle is so arranged that its spiral conformation provides a cam adapted to engage the outer end of the handle 9 as the latter is turned to close the upper end of the tube 3, whereby the closure 8 will be caused to bind closely against and in contact with the upper end of the tube.

The outermost portion of the cover 2 is formed with a U-shaped flange 2' and received in this flange is a gasket 2ª of rubber or the like. Clamped between the gasket 2ª and the lower side of the U-shaped flange 2' is a horizontal flange which projects laterally from a vertical or annular plate 11, the latter fitting into the receptacle 1 and constituting an extension of the cover. The parts 2', 2ª, and 11 afford an air tight connection between the cover of the receptacle and the upper end of the receptacle abuts with the gasket 2ª when the cover is in position.

Having thus fully described my invention, what is claimed as new is:—

1. An attachment for receptacle covers comprising a whistle tube secured to said cover and a closure for said tube, and a handle surrounding the tube and forming a guard therefor.

2. An attachment for receptacle covers comprising a whistle tube fastened to said cover and a handle composed of coiled wire surrounding said tube and secured to the receptacle in spaced relation to the tube, and a closure for the tube having a handle projecting outwardly and terminating slightly beyond a side of the handle.

3. An attachment for receptacle covers comprising a whistle tube, a reed plate in said tube, a reed carried by said plate, a closure pivoted to the reed plate and having an outwardly extending handle, and a handle for the cover comprising coiled wire surrounding the tube in spaced relation thereto, one of the coils of the handle being arranged for engagement with the handle of the closure and forming a cam in coöperation therewith.

In testimony whereof I affix my signature in presence of witnesses.

LARS A. KALLSTROM.

Witnesses:
JOHN H. SMITH,
CHAS. F. SJOSTEN,
NENA H. MOORE.